No. 857,115. PATENTED JUNE 18, 1907.
W. SCHÖNLEBER.
HEAT CONDUCTOR.
APPLICATION FILED JUNE 12, 1906.
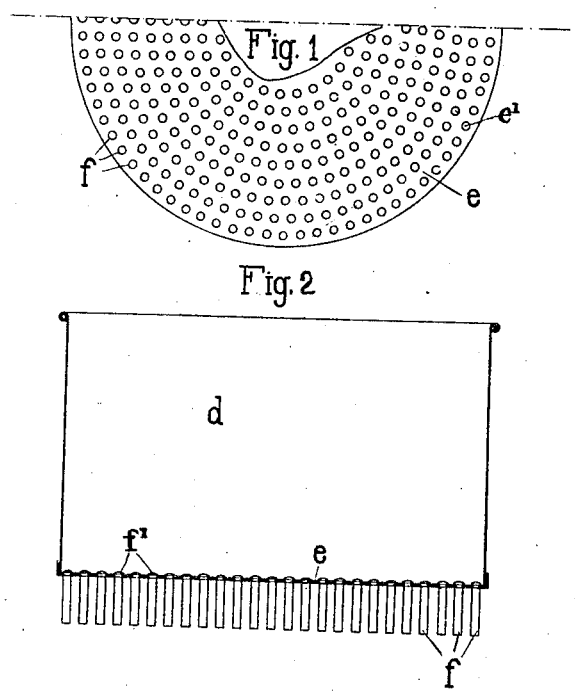

UNITED STATES PATENT OFFICE.

WILHELM SCHÖNLEBER, OF STRASSBURG, GERMANY.

HEAT-CONDUCTOR.

No. 857,115.  Specification of Letters Patent.  Patented June 18, 1907.

Application filed June 12, 1906. Serial No. 321,321.

*To all whom it may concern:*

Be it known that I, WILHELM SCHÖNLEBER, a subject of the German Emperor, and residing at Strassburg, Alsace, Germany, have invented certain new and useful Improvements in Heat-Conductors, of which the following is a specification.

My invention relates to cooking apparatus or utensils, and the like and has for its object to provide for this class of devices an increased heating surface and consequently increased effectiveness in operation.

With this object in view my invention consists in the improved construction, arrangement and combination of parts hereinafter fully described and afterward specifically claimed.

In the accompanying drawing, in which I have illustrated an approved embodiment of my invention, Figure 1, is a bottom plan view of one half of a vessel constructed in accordance with my invention, and Fig. 2, is a vertical sectional view thereof.

Referring specifically to the drawing, $d$ indicates the body and $e$ the bottom of a pot or other vessel or utensil, the material of the latter being preferably, although not necessarily, slightly thicker than the former, and having a large number of perforations $e'$ therein as most clearly indicated in Fig. 1, in each of which perforations is secured a thimble, or short closed ended tube as at $f, f$, in Fig. 2.

In manufacturing this device, I take the bottom $e$, either before or after it has been secured to the body $d$, and insert in each perforation successively one of the thimbles $f$, which will be made to fit neatly therein. I then, by any well known means, upset or rivet the inner closed end of the thimble in the opening, the result being as clearly shown in Fig. 2, that the inner end of the thimble is slightly expanded, forming a head as at $f''$, projecting slightly into the body of the vessel while that portion adjacent to the head is firmly set into the opening. By this means the thimbles are rigidly secured in position to project into the fire or into the gases or products of combustion, when placed upon a stove or other heating apparatus, so that they are much more quickly heated to a high degree than is the bottom itself and this heat is conducted rapidly to the bottom of the vessel and to the heads of the thimbles which project slightly into the contents of the vessel. The contents of the vessel will therefore be much more quickly heated than would be the case with an ordinary bottom.

The heads or closed inner ends $f''$ of the thimbles form, in effect, inwardly projecting portions of the bottom $e$, and being part of the highly heated thimbles, they will much more readily and quickly be heated than they would if they were integrally part of the bottom.

What I claim as new is:

A vessel or utensil of the character described, having perforations through the bottom thereof, and thimbles with closed ends secured in said perforations, the closed ends or heads of the thimbles being upset or riveted in the perforations of the bottom and projecting slightly into the body of the vessel, forming virtually, not integrally, part of said bottom, substantially as and for the purpose set forth.

In testimony whereof I affix my signature in presence of two witnesses.

WILHELM SCHÖNLEBER.

Witnesses:
ALBERT NENNINGER,
BENJAMIN F. LIEFELD.